Figure 1:
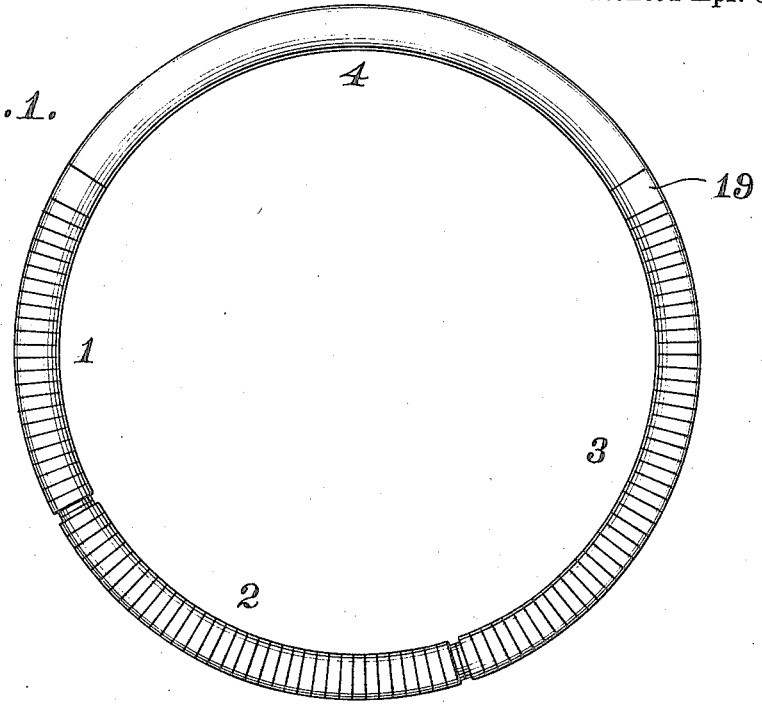

H. W. LEONARD, DEC'D.
C. G. LEONARD, ADMINISTRATRIX.
ELASTIC BELT.
APPLICATION FILED JULY 8, 1915.

1,264,193. Patented Apr. 30, 1918.

Inventor
Harry Ward Leonard, dec'd.
Carolyn G. Leonard, Admirx,
By her Attorneys
Edwards, Sager & Wooster.

UNITED STATES PATENT OFFICE.

HARRY WARD LEONARD, DECEASED, LATE OF BRONXVILLE, NEW YORK, BY CAROLYN G. LEONARD, ADMINISTRATRIX, OF BRONXVILLE, NEW YORK, ASSIGNOR TO H. WARD LEONARD, INCORPORATED, A CORPORATION OF NEW YORK.

ELASTIC BELT.

1,264,193.      Specification of Letters Patent.      Patented Apr. 30, 1918.

Application filed July 3, 1915. Serial No. 38,719.

*To all whom it may concern:*

Be it known that HARRY WARD LEONARD, deceased, late of Bronxville, in the county of Westchester and State of New York, has invented certain new and useful Improvements in Elastic Belts, of which the following is a full, clear, and exact specification.

The invention relates to elastic belts which are specially applicable to the coupling of two shafts turning at widely different speeds and the distance between the axes of which is small; also wherein the axes of the shafts may be fixed relatively to each other.

The general object of the invention is to obtain a noiseless, efficient and inexpensive form of power driving means which will have minimum depreciation, and which can be applied and removed quickly and simply, and in which the worn parts can be quickly and simply replaced. One object is to prevent the loss of power and the objectionable results caused by a belt being too tight or too loose. Another object is to avoid the necessity of frequent or refined adjustments. Another object is to reduce the space necessary for the power transmitting mechanism to a minimum. Another object is to secure a multiple belt drive wherein each belt acts to a large extent independently of the others and in which the number of belts may be multiplied as needed to transmit any desired amount of power, and wherein the transmission of power is rendered independent of the failure of any one unit.

Additional objects are to obtain improved tractive effort between the belt and the face of the pulley; to drive a smaller pulley than heretofore practical, or to utilize such a small pulley as a driving pulley; to reduce the weight of the belt for a certain duty; to increase the speed of the belt beyond that practical with former types under certain conditions; to provide means whereby an endless belt may be quickly and simply coupled at the two ends after being placed over the pulleys; and to provide a construction whereby a belt of any desired length may be quickly and simply made up from unit elements. There are various other objects and advantages obtained by my invention which will be understood from the following description.

The invention is particularly applicable to the driving of a dynamo for lighting and battery charging systems of motor cars employing a gasolene engine as a source of power. In such a system it is desirable to reduce the size, weight and cost of the generator as much as possible and it is desirable in most cases to drive the dynamo at about three times the speed of the gasolene engine, and the dynamo may have a speed as high as 6,000 revolutions per minute or more in practice. Moreover, the space for the dynamo and its driving shaft is usually very restricted. Prior driving mechanisms are undesirable for this particular use. If gears be employed they have to be very accurately made and adjusted and carefully oiled, and even then are not noiseless or free from wear. A chain drive is noisy and difficult to keep in proper adjustment. A leather belt requires means for adjusting the distances between the axes of the shafts for obtaining the proper tension. All of the prior forms also involve difficulties resulting from wear and in repairs or replacement of parts.

Figure 2:
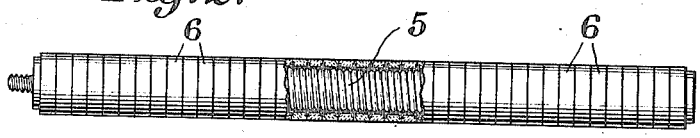
Figures 3, 4, 5, 6:
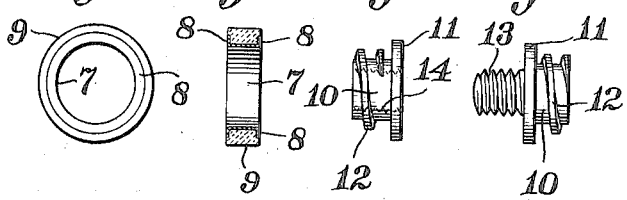
Figure 7:
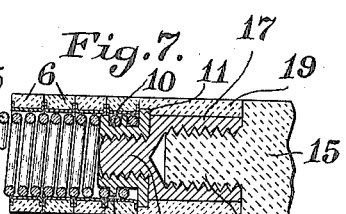
Figure 8:
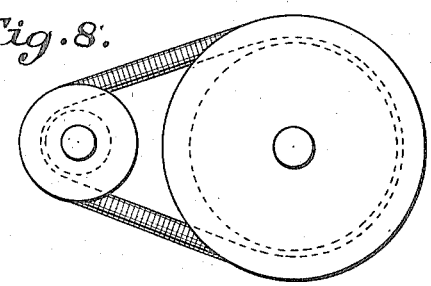
Figure 9:
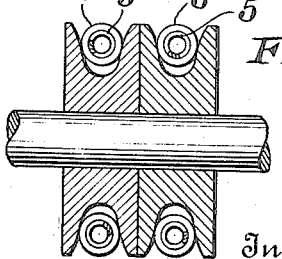

In the accompanying drawing, Figure 1 is a side view of a complete belt embodying the invention; Fig. 2 is a side view of a link section partly broken away to show the form of construction; Fig. 3 is a side view of one of the washers; Fig. 4 is a cross section of the same; Fig. 5 is a side view of one connecting part; Fig. 6 is a side view of another connecting part; Fig. 7 is a sectional view of a form of connection between a leather section and an elastic section; Fig. 8 is a side view of two pulleys provided with a belt embodying the invention, and Fig. 9 is a sectional view showing a plurality of pulleys side by side each having an individual elastic driving belt.

A belt constructed in accordance with the invention is preferably made up of a number of links or sections, Fig. 1 indicating four sections 1, 2, 3, 4. These sections may be all of the same length or may be of different lengths as indicated in Fig. 1, the sections of different lengths being used to make up the most desirable total length for the particular case. The sections 1, 2 and 3 are illustrated as elastic sections and the section 4 is illustrated as a non-elastic section, such a non-elastic section being usable, provided there is a sufficient length of elastic portion in the belt to give the advantageous results obtainable by means of the invention.

Elastic lengths or sections are provided with a coiled spring 5 as a core and the spring is enveloped by a plurality of washers 6 loosely movable over the spring core. The thickness of each washer is preferably two or more times the size of the wire forming the spring. Each washer is provided with a cylindrical metal inner lining 7 having flanges 8 upon which lining is mounted the bearing material 9 which is preferably leather or may be fiber, paper or other suitable material having a high co-efficient of friction for driving. The metal lining is desirable in maintaining the shape of the washers and in giving free movement between the spring and the washers and avoids excessive wear or cutting of the washers by the spring.

At each end of each link or section is a suitable connecting part. This connector must be such as to permit the section to be easily and quickly coupled or uncoupled; it must be short in length; it must be of a form such as not to unloosen during usage; and must be of a form wherein the wire spring is not subjected to any sharp bends or turns for making the connection so as to avoid breakage of the spring at such a sharp bend after a certain amount of use. The connector should also preferably be of a form which will preserve each section as a unit and not permit the washers from one section to work along the spring to another section. If the washers are not prevented from creeping along the whole length of the belt, they would leave openings on the side of the belt under tension and be crowded together on the side not under tension. In accordance with the improved form of connector, all of these desirable considerations are fulfilled.

The connectors are shown in Figs. 5 and 6 and are each provided with a hub 10 and a flange 11. On the hub is a thread 12 shown as forming one turn. The hub is the size of the inner diameter of the spring and the threaded portion of the hub is adapted to receive the end of the spring, which is connected thereto by threading the end of the spring onto the threaded hub of the connector. The connector at one end of a link section is formed with a threaded projection 13 shown in Fig. 6 and the connector at the other end of a link section is bored out and threaded as shown at 14 in Fig. 5, the threaded portion 14 being adapted to receive the threaded projection 13 of an adjacent link section.

In making up each link section, the spring is first attached to one connector and the washers are then threaded upon the spring, the spring being preferably extended somewhat so as to receive an additional number of washers than would be necessary to occupy the length of the spring when not under tension. The last connector is threaded on the end of the spring so that the link section when assembled is fully occupied by washers and the spring is under a certain amount of tension. The flanges 11 of the connectors hold the washers in place and keep them well distributed throughout the length of the belt instead of permitting excessive crowding on the side of the belt not under driving tension and comparatively loose on the side of the belt under driving tension.

In making up a complete belt, link sections of such lengths are selected as to cause the belt to be under proper tension when in place. The last connection in the belt is made by first twisting the ends backwardly with reference to the direction in which the connectors are turned for coupling them together, and then the connection is made and the connectors coupled by permitting the belt to twist in the direction to complete the screw connected between the two connectors. Thus when finally coupled, the belt has no tendency to twist or become disconnected at any part. In fact, the tendency of the belt is to maintain the connection at all points. It is evident that the belt before being finally coupled may be threaded over the shafts or pulleys to be driven and then the ends of the belt readily united in place, or the ends of the belt may be united and then extended and snapped into its grooved pulleys, a side view and a sectional view of a plurality of pulleys to which the invention is applicable being illustrated in Figs. 8 and 9.

In instances where a portion of the belt contains one or more sections which are not elastic, such as when a leather section is coupled with the above described elastic sections, a form of connection such as shown in Fig. 7 may be utilized. In this construction a connecting part such as shown in Fig. 5 is threaded to the end of an elastic section as already described and as indicated in Fig. 7. A round leather belt section is shown at 15 having a reduced portion 16 which engages a threaded hole in a connector 17. This connector has a threaded projecting part 18 adapted to engage the connector on the end of a spring section and is also provided with a cylindrical leather covering portion 19.

The washers are preferably circular, but in some instances will be specially shaped so as to be adapted to the particular form of grooved pulleys to which the belt is applied.

It is apparent that when any section of the improved belt becomes worn or requires renewal, or when the washers become worn sufficiently, the belt may be readily uncoupled and removed, and the washers or any desired section readily replaced and this may be accomplished without the necessity of any tools.

The elasticity of the spring is substantially unaffected by oil, moisture, or temperature, and when the belt is initially applied with proper tension, that tension is maintained substantially constant. By reason of the cushioning effect of the washers, the belt in operation is noiseless, also the spring is not likely to be crystallized and break after short usage, because the washers cushion and protect the spring from any severe shocks. The washers form a series of independent bearing surfaces on the pulley, each of which is in good contact therewith, securing a high coefficient of friction. Also, there is no air cushion formed between the belt and the pulley as in the case of ordinary belts at high speeds, which is another advantage with my improved belt permitting the required tension to be less than with usual belts.

Although I have described one embodiment of the invention, it will be understood that various modifications may be made therein without departing from the scope of the claims.

Having thus described the invention, what I declare is new and desire to secure by Letters Patent of the United States is:—

1. An elastic belt comprising a yieldable core of metal, and a plurality of washers around said core and axially movable thereon, said washers having bearing surfaces of metal on said core.

2. An elastic belt comprising a plurality of yieldable sections, each of said sections comprising a yieldable core and a plurality of washers movable thereon, and means for confining the washers of any one section to said section in their axial movement.

3. An elastic belt comprising a yieldable core, a plurality of washers axially movable thereon and connectors for coupling the ends of said belt, each of said connectors having a flange for retaining said washers on said core.

4. An elastic belt comprising a helical spring core, a plurality of washers axially movable thereon, and means for coupling the ends of said core together, said means having a threaded portion upon which at least one end of said spring is threaded, said means also having a flange for retaining said washers.

5. An elastic belt comprising a helical spring core, a plurality of washers axially movable thereon, and means for coupling the ends of said belt, said means comprising a pair of connectors, each of said connectors having a flange for retaining said washers on the core and also having a threaded engagement with each other.

6. A belt comprising a plurality of sections, at least one of said sections being non-elastic, and at least one of said sections being elastic and comprising an elastic core and a plurality of washers axially movable on said elastic core, and means for removably coupling said sections together.

7. An elastic belt comprising a helical spring core, a plurality of washers axially movable thereon, said washers having bearing surfaces of metal on said spring core, and means for removably coupling the ends of the belt together.

8. An elastic belt comprising a helical spring core, a plurality of washers axially movable thereon, said washers having bearing surfaces of metal on said spring core, connectors for coupling the ends of the belt together, each of said connectors having a threaded engagement with said spring, and having a threaded engagement with each other.

In testimony whereof I affix my signature, in presence of two witnesses.

CAROLYN G. LEONARD,

*Administratrix of the estate of Harry Ward Leonard.*

Witnesses:
  GENEVIEVE LEONARD,
  LEONARD KEBLER.